US008800205B2

(12) United States Patent
Yamaguchi et al.

(10) Patent No.: US 8,800,205 B2
(45) Date of Patent: Aug. 12, 2014

(54) DOOR OPENING-AND-CLOSING APPARATUS FOR VEHICLE

(75) Inventors: Junji Yamaguchi, Chiryu (JP); Koji Adachi, Kariya (JP); Masayuki Uchitsunemi, Chiryu (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 636 days.

(21) Appl. No.: 12/646,182

(22) Filed: Dec. 23, 2009

(65) Prior Publication Data

US 2010/0180508 A1 Jul. 22, 2010

(30) Foreign Application Priority Data

Jan. 16, 2009 (JP) ................................ 2009-007375
Sep. 30, 2009 (JP) ................................ 2009-226829
Sep. 30, 2009 (JP) ................................ 2009-226830

(51) Int. Cl.
*E05F 11/54* (2006.01)
(52) U.S. Cl.
USPC ................................ 49/358; 49/360; 296/155
(58) Field of Classification Search
USPC .............................. 49/358, 360, 352; 296/155
See application file for complete search history.

(56) References Cited

U.S. PATENT DOCUMENTS

| | | | | |
|---|---|---|---|---|
| 4,887,390 A | * | 12/1989 | Boyko et al. | 49/214 |
| 5,025,591 A | * | 6/1991 | DeLand et al. | 49/360 |
| 5,138,795 A | * | 8/1992 | Compeau et al. | 49/138 |
| 5,319,880 A | * | 6/1994 | Kuhlman | 49/360 |
| 6,530,619 B2 | * | 3/2003 | Fukumoto et al. | 296/155 |
| 6,729,071 B1 | * | 5/2004 | Kawanobe et al. | 49/360 |
| 6,918,209 B2 | * | 7/2005 | Regnier et al. | 49/352 |
| 6,935,071 B2 | * | 8/2005 | Yokomori et al. | 49/360 |
| 2008/0072498 A1 | * | 3/2008 | Rogers et al. | 49/360 |
| 2008/0178529 A1 | * | 7/2008 | Yoshida et al. | 49/352 |
| 2008/0302018 A1 | * | 12/2008 | Yamada et al. | 49/352 |
| 2010/0170159 A1 | | 7/2010 | Takeuchi et al. | |

FOREIGN PATENT DOCUMENTS

| | | |
|---|---|---|
| JP | 2003-082927 A | 3/2003 |
| JP | 2004-142681 A | 5/2004 |
| JP | 2007-186928 A | 7/2007 |
| JP | 2009-167632 A | 7/2009 |
| WO | 2009/107722 A1 | 9/2009 |

OTHER PUBLICATIONS

Japanese Office Action issued May 21, 2013 by the Japanese Patent Office in Japanese Patent Application No. 2009-226829 and partial English translation (4 pgs).

(Continued)

*Primary Examiner* — Gregory J. Strimbu
(74) *Attorney, Agent, or Firm* — Buchanan, Ingersoll & Rooney, PC

(57) ABSTRACT

A door opening-and-closing apparatus for a vehicle includes a rotatably driven drum, a first cable and a second cable, which cables are wound around the drum, a rotating shaft, a first pulley supported by the rotating shaft, a second pulley supported by the rotating shaft, an attachment member supporting the rotating shaft, a rigid protruding portion integral with one of the first and second pulleys, and an annular recessed portion integrally formed in the other one of the first and second pulleys. When the first and second pulleys are correctly assembled on the rotating shaft, a relative rotation between the first and second pulleys is allowed, and when the first and second pulleys are not correctly assembly on the rotating shaft, the predetermined length of the rotating shaft is not sufficient to support both the first and second pulleys.

3 Claims, 6 Drawing Sheets

(56) References Cited

OTHER PUBLICATIONS

Office Action (Notice of Reasons for Rejection) issued on Dec. 3, 2013, by the Japanese Patent Office in corresponding Japanese Patent Application No. 2009-226830, and an English Translation of the Office Action. (5 pages).

* cited by examiner

DOOR OPENING-AND-CLOSING APPARATUS FOR VEHICLE

CROSS REFERENCE TO RELATED APPLICATIONS

This application is based on and claims priority under 35 U.S.C. §119 to Japanese Patent Application 2009-007375, filed on Jan. 16, 2009, Japanese Patent Application 2009-226829, filed on Sep. 30, 2009, and Japanese Patent Application 2009-226830, filed on Sep. 30, 2009, the entire content of which are incorporated herein by reference.

TECHNICAL FIELD

This disclosure generally relates to a door opening-and-closing apparatus for a vehicle for driving a vehicle door to open and close a door opening, which is formed at a vehicle body.

BACKGROUND

Disclosed in JP2003-82927A is an example of a door opening-and-closing apparatus for a vehicle. According to the door opening-and-closing apparatus for the vehicle disclosed in JP2003-82927A, a vehicle door is movably supported at a vehicle body by means of a guide rail, which is fixed at the vehicle body. Furthermore, the door opening-and-closing apparatus for the vehicle disclosed in JP2003-82927A includes a cable, which is selectively reeled in and reeled out by a driving member fixed at the vehicle door. Both end portions of the cable are connected to the vehicle body. More specifically, one end portion of the cable is connected to a front end portion of the guide rail, which is fixed on the vehicle body, and the other end portion of the cable is connected to a rear end portion of the guide rail. Accordingly, the vehicle door is opened and closed when the cable is selectively reeled in or reeled out by the driving member.

Furthermore, according to the door opening-and-closing apparatus for the vehicle disclosed in JP2003-82927A, a pair of pulleys is rotatably provided at the vehicle door in order to guide the cable to be reeled from the vehicle door to the vehicle body. Each of the pulleys includes a rotational axis, so that the rotational axis of one of the pulleys differs from the rotational axis of the other one of the pulleys, and so that the rotational axes extend in a vehicle width direction. Furthermore, the pulleys are arranged so as to be in parallel with each other in a front-rear direction of the vehicle. Accordingly, a projected area of the entire pulleys in the front-rear direction is likely to be increased. In other words, the door opening-and-closing apparatus for the vehicle disclosed in JP2003-82927A requires a relatively large arrangement space. Furthermore, the pulleys need to be connected to the vehicle door so as to be rotatable about the respective rotational axes. Therefore, the pulleys are configured independently of each other so as to have a similar structure with each other (i.e. surrounding structures of the pulleys (e.g. the rotational axes and the like) overlap with each other), which may result in increasing a number of components used for the door opening-and-closing apparatus for the vehicle.

A need thus exists to provide a door opening-and-closing apparatus for a vehicle which is not susceptible to the drawback mentioned above.

SUMMARY

According to an aspect of this disclosure, a door opening-and-closing apparatus for a vehicle, includes a driving unit adapted to be fixed at a vehicle door for opening and closing a door opening formed at a vehicle body and having a driving source, a drum, which is rotatably driven by the driving source, and a cable, which is wound around the drum, the cable, whose first and second end portions are connected to the vehicle body, a rotating shaft adapted to be fixed at the vehicle door and extending in a vehicle width direction, a first pulley supported by the rotating shaft so as to be rotatable thereabout and having a first guide groove, within which one of the first and second end portions of the cable, which is reeled in and reeled out from the drum, is engaged in order to guide the one of the first and second end portions to be connected to the vehicle body, and a second pulley supported by the rotating shaft so as to be rotatable thereabout and so as to be arranged in parallel with the first pulley in the vehicle width direction, and having a second guide groove, within which the other one of the first and second end portions of the cable, which is reeled in and reeled out from the drum, is engaged in order to guide the other one of the first and second end portions to be connected to the vehicle body.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 3:
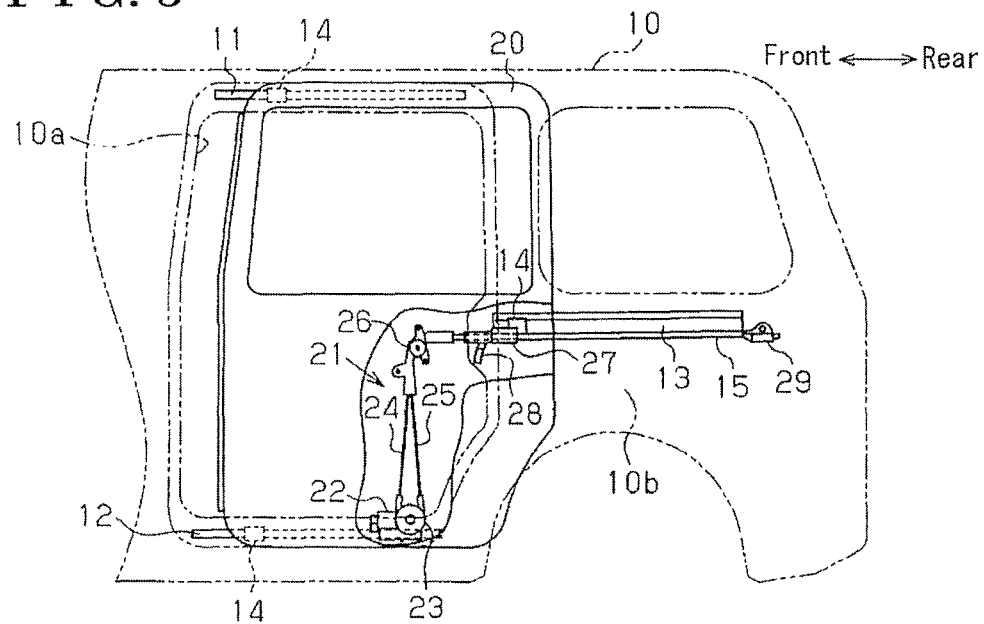
FIG. 3 is a diagram schematically illustrating a state where the door opening-and-closing apparatus for the vehicle according to the first embodiment is assembled to the vehicle.
Figure 4:
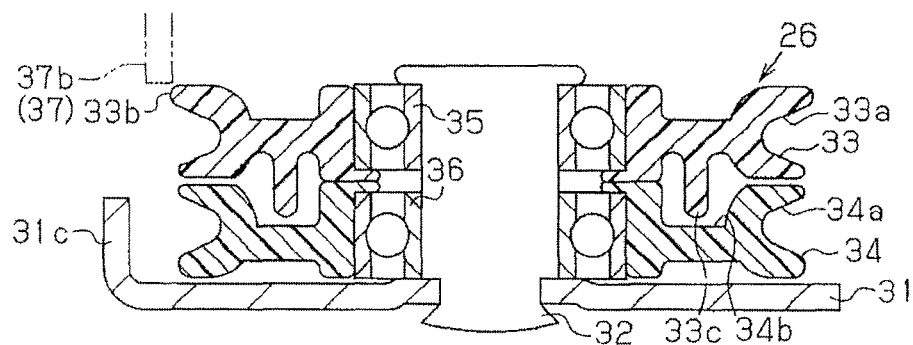
FIG. 4 is a cross-sectional diagram illustrating a state where the door opening-and-closing apparatus for the vehicle is misassembled.

A first embodiment of a door opening-and-closing apparatus for a vehicle (which will be hereinafter referred to as a door opening-and-closing apparatus) will be described below with reference to the attached drawings. Illustrated in FIG. 3 is a schematic diagram of the door opening-and-closing apparatus according to the first embodiment. As illustrated in FIG. 3, a vehicle body 10 includes an upper rail 11, a lower rail 12 and a center rail 13. The upper rail 11 is provided on the vehicle body 10 along an upper edge portion defining a door opening 10a, which is formed at a side portion of the vehicle body 10. The lower rail 12 is provided on the vehicle body 10 along a lower edge portion defining the door opening 10a. The center rail 13 is provided on a quarter panel 10b, which extends to a rear portion of the vehicle body relative to the door opening 10a, so as to extend in a front-rear direction of the vehicle. Furthermore, a slide door 20, which serves as a vehicle door, is supported by the upper rail 11, the lower rail 12 and the center rail 13 via respective guide roller units 14 so as to be movable in a front-rear direction of the vehicle. The slide door 20 opens and closes the door opening 10a in response to a movement of the slide door 20 in the front-rear direction. Additionally, a cable guide 15 is provided at the quarter panel 10b so as to extend along a lower edge portion of the entire center rail 13.

A driving member 21 (i.e. a driving unit) is provided at a lower portion within the slide door 20. The driving member 21 includes a driving motor 22 (i.e. a driving source), a drum 23, a first cable 24 and a second cable 25. The drum 23 is rotatably driven by the driving motor 22. The first and second cables 24 and 25 serve as a cable, which is wound around the drum 23. More specifically, the first and second cables 24 and 25 are wound around the drum 23 in a state where one end portion of the first cable 24 and one end portion of the second cable 25 are engaged with the drum 23. Furthermore, the first and second cables 24 and 25 are selectively reeled in and reeled out by the driving member 21.

The first and second cables 24 and 25 are guided to the vehicle body 10 from the slide door 20 via a relay pulley 26, which is fixed at a door inner panel of the slide door 20 by means of, for example, a bolt and a nut, and a guide pulley 27, which is connected to the guide roller unit 14 moving along the center rail 13, so as to extend along the cable guide 15 in the front-rear direction. The relay pulley 26 is provided at a rear portion of the door inner panel in the vicinity of a door belt line. Furthermore, the guide pulley 27 is provided at the door inner panel at a further rear position relative to the relay pulley 26. The relay pulley 26 is provided at the door inner panel of the slide door 20 in order to fluid-tightly guide the first and second cables 24 and 25 between an inner portion of the slide door 20 facing a compartment of the vehicle and an outer portion of the slide door 20 across the door inner panel.

The first cable 24 is guided to the cable guide 15 so as to be arranged at a front portion thereof in the front-rear direction of the vehicle. More specifically, the first cable 24 is connected to the vehicle body 10 at a front end portion of the cable guide 15 by means of, for example, a bolt and a nut, via a tensioner 28, which is connected to the other end portion of the first cable 24. The second cable 25 is guided to the cable guide 15 so as to be arranged at a rear portion thereof in the front-rear direction of the vehicle. More specifically, the second cable 25 is connected to the vehicle body 10 at a rear end portion of the cable guide 15 by means of, for example, a bolt and a nut, via a tensioner 29, which is connected to the other end portion of the second cable 25.

Accordingly, for example, in a case where the first cable 24 is reeled out while the second cable 25 is reeled in by means of the driving member 21, the slide door 20 is rearwardly moved, thereby opening the door opening 10a. On the other hand, in a case where the first cable 24 is reeled in while the second cable 25 is reeled out by means of the driving member 21, the slide door 20 is forwardly moved, thereby closing the door opening 10a.

Figure 1:
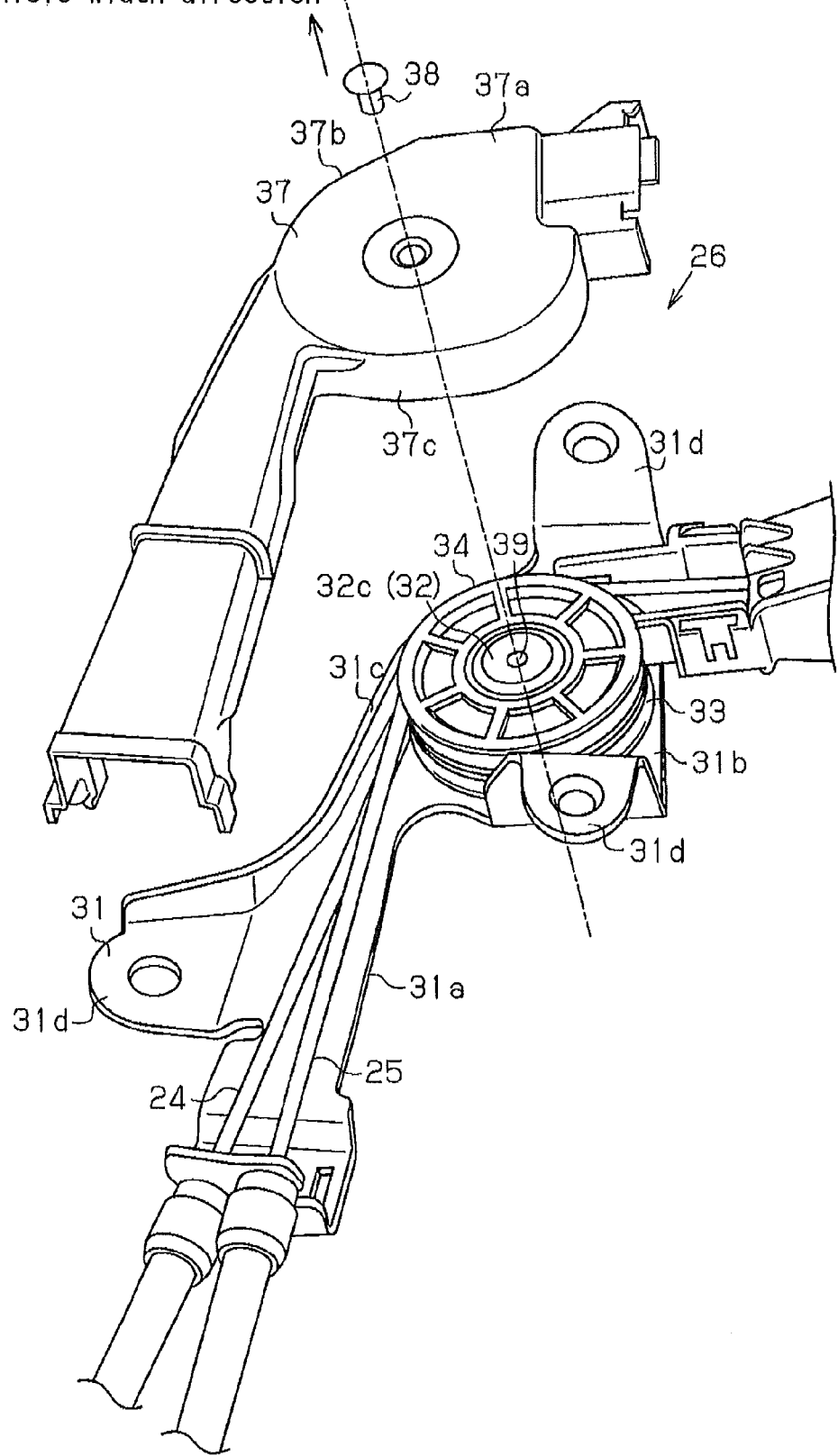
FIG. 1 is an exploded perspective view illustrating a door opening-and-closing apparatus for a vehicle according to a first embodiment.
Figure 2:
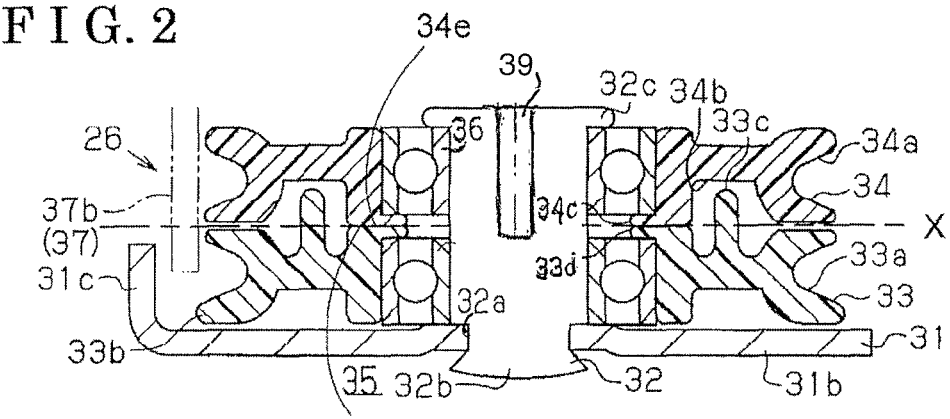
FIG. 2 is a cross-sectional diagram illustrating a portion of the door opening-and-closing apparatus for the vehicle according to the first embodiment.

A detailed explanation about the relay pulley 26 will be given below. Illustrated in FIG. 1 is an exploded perspective view of the relay pulley 26. Illustrated in FIG. 2 is a cross-sectional view of the relay pulley 26. As illustrated in FIG. 1, the relay pulley 26 includes a base plate 31, which is obtained by, for example, forming a metal plate in a substantially P-shape. The base plate 31 serves as an attachment member. The base plate 31 includes a guide wall 31a, a support wall 31b and a flange 31c. The guide wall 31a extends in a vehicle height direction and configures an entrance/exit for the first and second cables 24 and 25, which are extended from the drum 23. The support wall 31b is continuously formed at an upper end portion of the guide wall 31a so as to form a substantially D-shape. The flange 31c is formed so as to continuously extend along upper end portions of the support wall 31b and the guide wall 31a (i.e. at an upper end portion orthogonal to the support wall 31b) in a vehicle width direction. Furthermore, the base plate 31 includes plural attachment portions 31d, each of which is formed in a substantially P-shape and each of which outwardly extends to form a tongue shape. The base plate 31 is connected to the door inner panel of the slide door 20 by means of bolts, which penetrate the respective attachment portions 31d.

As illustrated in FIG. 2, a rotating shaft 32, which is formed in a substantially column shape extending in a direction orthogonal to the support wall 31b (i.e. in the vehicle width direction), is fixed at the support wall 31b so as not to be disengaged therefrom. More specifically, the rotating shaft 32 includes a reduced diameter portion 32a and an enlarged diameter portion 32b. A diameter of an end portion of the rotating shaft 32 facing the support wall 31b is reduced so as to from the reduced diameter portion 32a. An end portion of the reduced diameter portion 32a is pressed to enlarge the diameter thereof by caulking in order to form the enlarged diameter portion 32b. Accordingly, the rotating shaft 32 is fixed on the support wall 31b in a manner where a base end portion (i.e. a stepped portion) of the rotating shaft 32 continuing to the reduced diameter portion 32a and the enlarged diameter portion 32b sandwich the support wall 31b.

The rotating shaft 32 includes an engagement flange 32c, which is formed in a disc shape, at the other end portion of the rotating shaft 32 (i.e. at a portion of the rotating shaft 32 away from the support wall 31b) in an axial direction thereof, so as to be outwardly enlarged in a radial direction thereof. A first pulley 33 and a second pulley 34 are rotatably supported by the rotating shaft 32 via first and second bearings 35 and 36, respectively, in a manner where the first and second pulley 33 and 34, which are arranged in parallel with each other in the axial direction (i.e. the vehicle width direction), are disposed between the support wall 31b and the engagement flange 32c. A roller bearing is adapted as each of the first and second bearings 35 and 36. More specifically, an inner race of each of the first and second bearings 35 and 36 is press-fitted onto the rotating shaft 32. Furthermore, the first and second bearings 35 and 36 are disposed between the support wall 31b and the engagement flange 32c, thereby supporting the first and second bearings 35 and 36 on the rotating shaft 32 so as not to be disengaged therefrom.

The first pulley 33 is press-fitted onto an outer race of the first bearing 35, which is arranged at a position closer to the base plate 31 (i.e. the support plate 31b). Furthermore, the first pulley 33 includes a first guide groove 33a at a radially outer end portion of the first pulley 33, so that the first cable 24, which is reeled around and reeled out from the drum 23, is guided to and engaged with the first guide groove 33a. Additionally, the first pulley 33 includes an enlarged diameter portion 33b at a portion thereof closer to the base plate 31 relative to the first guide groove 33a, so that a diameter of the enlarged diameter portion 33b of the first pulley 33 is set to be greater than a diameter of the first pulley 33 at a portion away from the base plate 31 relative to the first guide groove 33a. A clearance formed between the enlarged diameter portion 33b and the flange 31c in the radial direction is set to have a width so that the first cable 24 does not enter thereinto. Furthermore, the first pulley 33 includes a protruding portion 33c, which is formed in an annular shape. The first pulley 33 includes an inner flange 33d, which is formed in an annular shape and which inwardly extends in a radial direction of the first pulley along an end surface of the outer race of the first bearing 35 facing the second bearing 36. Additionally, the flange 31c is arranged along the first guide groove 33a while keeping a distance from the outer circumferential surface of the first pulley 33 (the first guide groove 33a).

The second pulley 34 is press-fitted onto an outer race of the second bearing 36, which is arranged at a position away from the base plate 31 (i.e. the support wall 31b) relative to the first bearing 35. Furthermore, the second pulley 34 includes a second guide groove 34a at a radially outer end portion of the second pulley 34, so that the second cable 25, which is reeled around and reeled out from the drum 23, is guided to and engaged with the second guide groove 34a. An outer diameter of the second pulley 34 is set to be the same as an outer diameter of a portion of the first pulley 33 away from the base plate 31 relative to the groove portion 33a. Furthermore, an annular recessed portion 34b is formed at a surface of the second pulley 34 facing the first pulley 33 (i.e. the protruding portion 33c of the first pulley 33). The first and second pulleys 33 and 34 are arranged so as to be rotatable relative to each other while the protruding portion 33c of the first pulley 33 is accommodated within the annular recessed portion 34b of the second pulley 34 while keeping a clearance therebetween. In other words, the first and second pulleys 33 and 34 are provided onto the base plate 31 so as to be rotatable in a manner where the second pulley 34 is piled on the first pulley 33 in the axial direction of the rotating shaft 32 so that the a predetermined surface 33e having the protruding portion 33c faces a predetermined surface 34e having the annular recessed portion 34b. Accordingly, the protruding portion 33c is arranged so as to protrude towards the second pulley 34 from the first pulley 33 while extending over a contact surface extended line X, which is an extended line where the predetermined surfaces 33e and 34e of the respective first and second pulleys 33 and 34 contact, in the axial direction. Additionally, the second pulley 34 includes an inner flange 34c, which is formed in an annular shape and which inwardly protrudes in a radial direction thereof along the inner flange 33d of the first pulley 33 and along an end surface of the outer race of the second bearing 36 facing the first bearing 35.

Accordingly, the inner flange 33d of the first pulley 33 and the inner flange 34c of the second pulley 34 are disposed between the outer race of the first bearing 35 and the outer race of the second bearing 36, which are engaged onto the rotating shaft 32 so as not to be disengaged therefrom. As a result, the first and second pulleys 33 and 34 are attached onto the rotating shaft 32 so as not to be disengaged therefrom. Additionally, although the first and second pulleys 33 and 34 slidably contact or are arranged close to each other at the inner flanges 33d and 34c, the first and second pulleys 33 and 34 are allowed to smoothly rotate relative to each other because a clearance is formed between the radially outer circumferential portions where the guide grooves 33a and 34a are formed, respectively.

As illustrated in FIG. 1, a cover member 37, which is made of, for example, resin and the like, is attached to the base plate 31, on which the first and second pulleys 33 and 34 and the like are assembled. The cover member 37 includes a top plate portion 37a and side wall portions 37b and 37c. The top plate portion 37a is formed in a substantially P-shape so as to correspond with an outer shape of the base plate 31. The side wall portions 37b and 37c are formed so as to protrude towards the base plate 31 from respective end portions of the top plate portion 37a in the vehicle width direction. The cover member 37 is placed on the base plate 31 in a state where the side wall portions 37b and 37c are positioned inside the base plate 31 relative to the flange 31c and the attachment portions 31d, respectively. Then, a pin 38 (an example of a fixing portion), which penetrates the upper plate portion 37a in the axial direction of the rotating shaft 32, is inserted into a pin hole 39, which is formed at the rotating shaft 32, thereby fixing the cover member 37 on the base plate 31. In this case, as illustrated in FIG. 2, the side wall portion 37b of the cover member 37 covers (surrounds) the outer circumferential portions of the first and second pulleys 33 and 34 except for the enlarged diameter portion 33b of the first pulley 33. Accordingly, the first and second cables 24 and 25, which are engaged with the first and second pulleys 33 and 34, are avoided from being disengaged from the guide grooves 33a and 34a, respectively, by means of the cover member 37 and the flange 31c of the base plate 31.

Assembling of the relay pulley 26 will be described below. Firstly, the first pulley 33 is press-fitted onto the first bearing 35 until the inner flange 33d engages with the outer race of the first bearing 35. Similarly, the second pulley 34 is press-fitted onto the second bearing 36 until the inner flange 34c engages with the outer race of the second bearing 36.

Secondly, the second pulley 34, which is press-fitted onto the second bearing 36, is press-fitted onto the rotating shaft 32 from the reduced diameter portion 32a of the rotating shaft 32 until the second pulley 34 engages with the engagement flange 32c, so that the annular recessed portion 34b and the inner flange 34c are positioned opposite from the engagement flange 32c. Then, the first pulley 33, which is press-fitted onto the first bearing 35, is press-fitted onto the rotating shaft 32 from the reduced diameter portion 32a of the rotating shaft 32 until the inner flange 33d of first pulley 33 contacts or is positioned close to the inner flange 34c of the second pulley 34, so that the protruding portion 33c and the inner flange 33d are positioned so as to face the second pulley 34.

Thirdly, the rotating shaft 32, to which the first and second pulleys 33 and 34 and the like are attached as described above, are placed on the base plate 31 (i.e. the support wall 31b). Then, the end portion of the reduced diameter portion 32a of the rotating shaft 32, which penetrates the support wall 31b, is pressed to enlarge the diameter thereof by the caulking in order to form the enlarged diameter portion 32b. Accordingly, the rotating shaft 32 is engaged with the base plate 31 so as not to be disengaged therefrom while rotatably supporting the first and second pulleys 33 and 34 via the respective first and second bearings 35 and 36, which are disposed between the support wall 31b and the engagement flange 32c.

Fourthly, the first and second cables 24 and 25 are engaged with the first and second pulleys 33 and 34, respectively. Then, the cover member 37 is attached and fixed on the base plate 31, on which the first and second pulleys 33 and 34, the first and second cables 24 and 25 and the like are assembled. The outer circumferential surfaces of the respective first and second pulleys 33 and 34 are surrounded by the side wall portion 37b, expect for the enlarged diameter portion 33b of the first pulley 33. Accordingly, the first and second cables 24 and 25 are avoided from being disengaged from the guide grooves 33a and 34a of the first and second pulleys 33 and 34, respectively, by means of the flange 31c of the base plate 31 and the side wall portion 37b of the cover member 37.

A case where the first and second pulleys 33 and 34 and the first and second bearings 35 and 36 are misassembled on the rotating shaft 32 (and the base plate 31) so that the entire first and second pulleys 33 and 34 and the first and second bearings 35 and 36 are arranged upside down, will be described below. In this case, the first pulley 33 is arranged so that the enlarged diameter portion 33b thereof is positioned the farthest away from the base plate 31. In other words, the enlarged diameter portion 33b of the first pulley 33 is positioned the closest to the cover member 37, which is attached to the base plate 31. In this case, the cover member 37 is not properly attached to the base plate 31, because the side wall portion 37b of the cover member 37 interferes with the enlarged diameter portion 33b of the first pulley 33. Therefore, the misassembly is easily recognizable.

According to the first embodiment, the first and second pulleys 33 and 34, which guide the end portions of the first and second cables 24 and 25, respectively, are arranged in parallel with each other in the vehicle width direction, while the first and second pulleys 33 and 34 are rotatably supported by the single rotating shaft 32, which is arranged so as to extend in the vehicle width direction. Accordingly, a projected area of the entire first and second pulleys 33 and 34, i.e. an arrangement space for the first and second pulleys 33 and 34, in the front-rear direction of the vehicle may be reduced. Furthermore, because the first and second pulleys 33 and 34 are connected to the slide door 20 while allowing the first and second pulley 33 and 34 to rotate about the single rotating shaft 32, only the single cover member 37 and the single pin 38 need to be prepared. Therefore, a number of components used for the door opening-and-closing apparatus may be reduced.

Furthermore, according to the first embodiment, the first and second pulleys 33 and 34 are rotatably arranged on the base plate 31 in the state where the second pulley 34 is placed on the first pulley 33 in the axial direction of the rotating shaft 32 so that the predetermined surfaces 33e and 34e of the respective first and second pulleys 33 and 34 face each other. The protruding portion 33c is formed at the first pulley 33 and the annular recessed portion 34b is formed at the second pulley 34 so as not to interrupt the relative rotation of the first and second pulleys 33 and 34. In this case, assuming that the first pulley 33 is arranged upside down on the base plate 31, so that the protruding portion 33c protrudes towards the base plate 31. In this case, because a length of the entire first and second pulleys 33 and 34 with reference to the base plate 31 is increased in the axial direction of the rotating shaft 32 by a length (i.e. a protruding amount) of the protruding portion 33c, the rotating shaft 32 is not likely to properly support the first and second pulleys 33 and 34 by its length. In other words, a protruding amount (i.e. a length) of the reduced diameter portion 32a, which penetrates the base plate 31 (i.e. the support wall 31b), becomes insufficient, so that the enlarged diameter portion 32b may not be properly formed. Therefore, even if the first pulley 33 is mistakenly arranged upside down, the improper arrangement of the first pulley 33 is recognizable because of a shortage of the length of the rotating shaft 32. Accordingly, a reliability on the assembly of the door opening-and-closing apparatus may be enhanced. Specifically, because the misassembly of the door opening-and-closing apparatus is likely to be recognized before the enlarged diameter portion 32b is formed, a loss of a component for the door opening-and-closing apparatus may be reduced.

The misassembly of the door opening-and-closing apparatus may be recognizable even in a case where the second pulley 34 is arranged upside down relative to the first pulley 33, which is normally assembled, because of the shortage of the length of the rotating shaft 32 in this case.

According to the first embodiment, the first pulley 33 includes the enlarged diameter portion 33b at the portion thereof positioned closer to the base plate 31 relative to the first guide groove 33a. Therefore, if the first pulley 33 is arranged upside down, so that the enlarged diameter portion 33b is positioned away from the base plate 31, the first cable 24 may not be engaged with the first pulley 33 in a case where the first cable 24 is inserted into the clearance formed between the first pulley 33 and the flange 31c from an opening thereof, because the flange 31c is arranged along the outer circumferential surface of the first pulley 33 and because the first cable 24 interferes with the enlarged diameter portion 33b. In other words, even if the first pulley 33 is mistakenly arranged upside down, the improper arrangement of the first pulley 33 is recognizable because the first cable 24 interferes with the enlarged diameter portion 33b and the first cable 24 may not be attached to the first pulley 33 or my have difficulty in being attached to the first pulley 33. Accordingly, the reliability on the assembly of the door opening-and-closing apparatus may be enhanced.

According to the first embodiment, the cover member 37 is attached to the base plate 31 so as to cover (surround) the outer circumferential surfaces of the first and second pulleys 33 and 34, except for the enlarged diameter portion 33b. Therefore, if the first pulley 33 is arranged away from the base plate 31, the enlarged diameter portion 33b thereof interferes with the cover member 37 (i.e. the side wall portion 37b), so that the cover member 37 may not be properly assembled to the base plate 31. Accordingly, even if the first pulley 33 is mistakenly arranged away from the base plate 31, the improper arrangement of the first pulley 33 is recognizable because the enlarged diameter portion 33b interferes with the cover member 37 when the cover member 37 is attached to the base plate 31. Hence, the reliability on the assembly of the door opening-and-closing apparatus may be further enhanced.

According to the first embodiment, because the flange 31c is formed on the base plate 31 so as to be positioned along the outer circumferential surface of the first pulley 33 while keeping a clearance therefrom, the second cable 25 may be avoided from being engaged within the first guide groove 33a after the first cable 24 is engaged within the first guide groove 33a. On the other hand, even if the first and second cables 24 and 25 are mistakenly engaged within the second guide groove 34a, because the cover member 37 (i.e. the side wall portion 37b) interferes with either the first cable 24 or the second cable 25, which are engaged within the single guide groove 34a, the cover member 37 may not properly be attached to the base plate 31. Therefore, even in this case, the misassembly is recognizable.

According to the first embodiment, the arrangement space for the relay pulley 26 (i.e. the first and second pulleys 33 and 34), which is arranged at the rear position at the door inner panel of the slide door 20 in the vicinity of the door belt line, in the front-rear direction of the vehicle is reduced. Therefore, the relay pulley 26 is surely avoided from being exposed to the outside of the slide door. Specifically, in a case where the relay pulley 26 is arranged in the vicinity of a base end portion of a door frame, which configures a window frame of the slide door 20, the pulley 26 is surely hidden even if an area of a garnish, which decorates the door frame, is relatively small.

Second Embodiment

A second embodiment of a door opening-and-closing apparatus will be described below with reference to the attached drawings. The door opening-and-closing apparatus of the second embodiment differs from the door opening-and-closing apparatus of the first embodiment in that a drum and a relay pulley (i.e. first and second pulleys) are integrally accommodated within a single cover member. Therefore, only the difference between the first and second embodiments will be described below.

Figure 5:
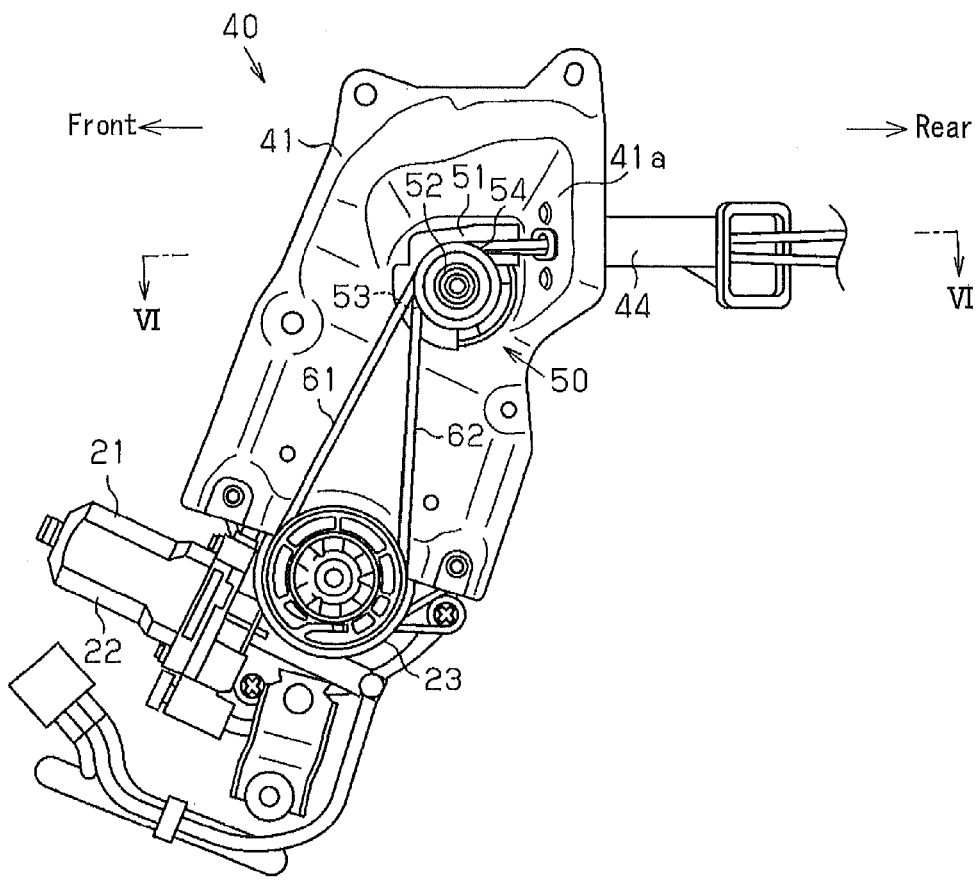
FIG. 5 is a front view of a door opening-and-closing apparatus for a vehicle according to a second embodiment.

As illustrated in FIG. 5, the door opening-and-closing apparatus of the second embodiment includes a door-side unit 40, which is attached on the door inner panel of the slide door 20. For example, the door-side unit 40 is made of a metal panel. Furthermore, the door-side unit 40 includes a bracket 41, which is formed to extend substantially in the vehicle height direction and which serves as an attachment member. The bracket 41 is fixed on the door inner panel by means of, for example, a bolt and a nut. The bracket 41 includes an inclined portion 41a at an upper rear end portion of the bracket 41 so as to incline towards a rear portion of the bracket 41 in a door thickness direction (i.e. towards a near side in a direction orthogonal to a paper surface of FIG. 5).

The driving member 21 is fixed at a lower end portion of the bracket 41 by means of, for example, a bolt and a nut. More specifically, the driving member 21 is attached at the bracket 41 in a state where the drum 23 is arranged at a lower portion of the bracket 41. A first cable 61 and a second cable 62, which serve as the cable, are wounded around the drum 23. More specifically, the first and second cables 61 and 62 are wound around the drum 23 in a state where end portions of the respective first and second cables 61 and 62 are engaged with the drum 23. The first and second cables 61 and 62 are selectively reeled around and reeled out from the drum 23 by the driving member 21.

Figure 6:
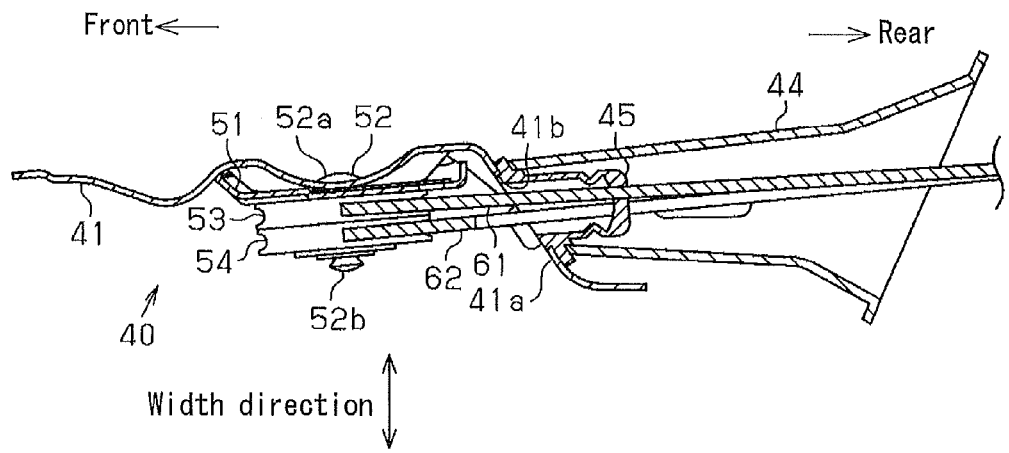
FIG. 6 is a cross-sectional diagram taken along line VI-VI in FIG. 5.

A relay pulley 50 is attached at an upper end portion of the bracket 41 so as to be upwardly positioned away from the driving member 21 in the vehicle height direction and so as to be positioned in front of the inclined portion 41a in the front-rear direction. The relay pulley 50, which is obtained by forming a metal plate in a substantially plate shape, includes a base plate 51 that is fixed on the bracket 41 by means of, for example, a bolt and a nut. As illustrated in FIG. 6, which is a cross-sectional diagram of the door-side unit 40 taken along line VI-VI in FIG. 5, a rotating shaft 52, which is formed in a substantially column shape and which extends in a direction orthogonal to the base plate 51 (i.e. the vehicle width direction), penetrates the base plate 51 and the bracket 41. A first pulley 53 and a second pulley 54 are rotatably supported by the rotating shaft 52 in the state where the first pulley 53 is placed on the second pulley 54 in an axial direction of the rotating shaft 52 (i.e. the vehicle width direction). Accordingly, the first and second pulleys 53 and 54 are allowed to rotate relative to each other in the state where the first pulley 53 is placed on the second pulley 54 in the axial direction of the rotating shaft 52. Additionally, the first and second pulleys 53 and 54 are formed so that an outer diameter of the first pulley 53 corresponds with an outer diameter of the second pulley 54. The rotating shaft 52 includes an engagement flange 52a, which is formed in a bump shape whose diameter is set to be greater than a diameter of the rotating shaft 52, at one end portion of the rotating shaft 52. Furthermore, the rotating shaft 52 includes an enlarged diameter portion 52b at the other end portion thereof. More specifically, the enlarged diameter portion 52b is obtained by pressing the other end portion of the rotating shaft 52 penetrating the second pulley 54 by caulking so that the diameter of the rotating shaft 52 is enlarged and so that the enlarged diameter portion 52b is formed in a substantially circular truncated cone. Accordingly, the first and second pulleys 53 and 54 are supported at the rotating shaft 52 so as not to be disengaged therefrom in a state there the first and second pulleys 53 and 54 are sandwiched between the engagement flange 52a (i.e. the base plate 51) and the enlarged diameter portion 52b.

The first cable 61, which is reeled around and reeled out from the drum 23, is guided to and engaged with the first pulley 53, which is arranged closer to the base plate 51 (the bracket 41). The second cable 62, which is reeled around and reeled out from the drum 23, is guided to and engaged with the second pulley 54, which is arranged away from the base plate 51 (the bracket 41) relative to the first pulley 53. As illustrated in FIG. 5, the first and second cables 61 and 62 are hanged on the respective first and second pulleys 53 and 54 so as to be guided from a front portion thereof towards the rear portion of the vehicle in a clockwise direction. Accordingly, the first and second cables 61 and 62 are arranged so as to form an inverted V-shape between the drum 23 and the first and second pulleys 53 and 54. In other words, the first and second cables 61 and 62 are linearly guided to the respective first and second pulleys 53 and 54 from the drum 23 while the first and second cables 61 and 62 are exposed without being guided by a casing. Furthermore, as illustrated in FIG. 6, the first and second cables 61 and 62 are guided from the slide door 20 to the vehicle body 10 via a hole 41b, which is formed on the inclined portion 41a, and a cable guiding member 44.

A seal member 45, which is made of, for example, a rubber member and which is formed in a cylinder shape having a bottom cover, is inserted into the hole 41b so as to close the hole 41b (an opening portion of the cable guiding member 44). Accordingly, a space formed at a front portion of the door-side unit 40 relative to the inclined portion 41a of the bracket 41 (i.e. an arrangement space for the first and second pulleys 53 and 54) is in communication with an outside of the slide door 20 (i.e. the vehicle door 10) via the hole 41b, the cable guiding member 44, to which the seal member 45 is attached, and the like. The first and second cables 61 and 62, which are engaged with the respective first and second pulleys 53 and 54, are guided to the outside of the slide door 20 via the hole 41b, the cable guiding member 44 and the like. Additionally, the first and second cables 61 and 62 fluid-tightly penetrate the seal member 45, so that water is avoided from entering into the arrangement space for the first and second pulleys 53 and 54 (i.e. the bracket 41).

The first and second cables 61 and 62, which are guided to the outside of the slide door 20, are further guided to the vehicle body 10 from the slide door 20 via the relay pulley 27. Then, the first and second cables 61 and 62 are arranged in the front-rear direction along the cable guide 15, as is the case with the first embodiment. The door-side unit 40 (i.e. the first and second pulley 53 and 54 and the like) is arranged so as to correspond to a position where the center rail 13 is arranged in the vehicle height direction. For example, in a case where the first cable 61 is reeled out while the second cable 62 is reeled in by means of the driving member 21, the slide door 20 is rearwardly moved in the front-rear direction so as to open the door opening 10a. On the other hand, in a case where the first cable 61 is reeled in while the second cable 62 is reeled out by means of the driving member 21, the slide door 20 is forwardly moved so as to close the door opening 10a.

Figure 7:
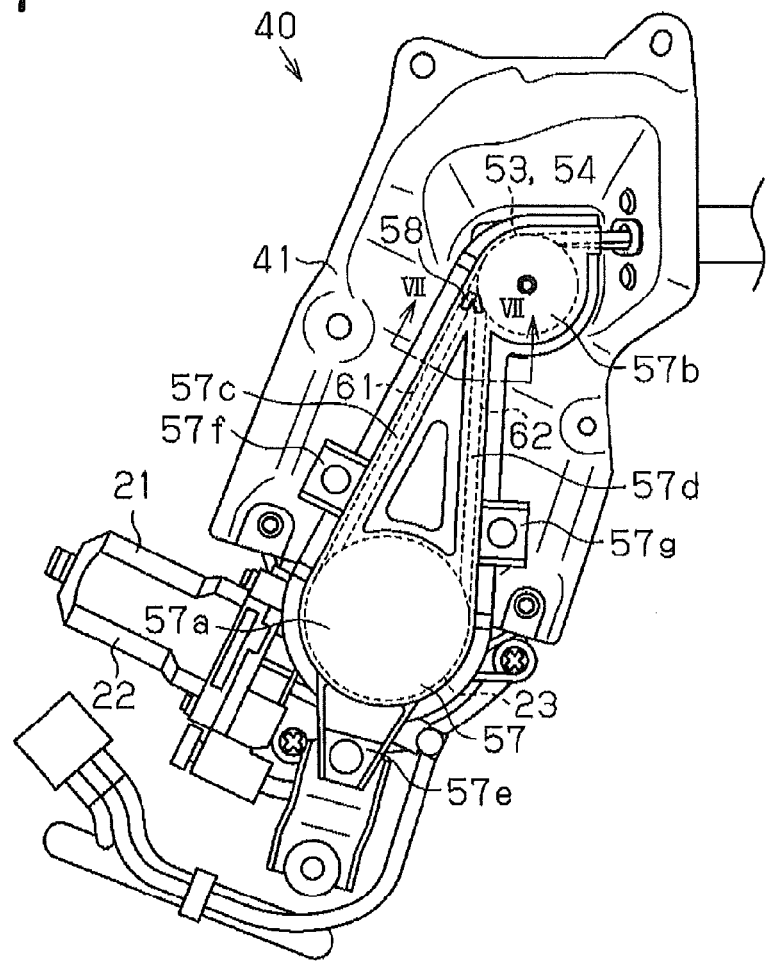
FIG. 7 is a front view of the door opening-and-closing apparatus for the vehicle according to the second embodiment.

As illustrated in FIG. 7, a cover member 57, which is made of, for example, resin, is attached to the bracket 41, on which the drum 23, the first pulley 53, the second pulley 54 and the like are assembled. The cover member 57 is formed to open towards the bracket 41, i.e. in the vehicle width direction (i.e. backwardly in the direction orthogonal to a paper surface). Furthermore, the cover member 57 integrally includes a drum cover portion 57a, a pulley cover portion 57b, a first cable cover portion 57c and a second cable cover portion 57d. The drum cover portion 57a, which is formed in a cylinder shape having a bottom cover portion, accommodates the drum 23 while allowing the drum 23 to rotate. The pulley cover portion 57b, which is formed in a cylinder shape having a bottom cover portion, accommodates the first and second pulleys 53 and 54 while allowing the first and second pulleys 53 and 54 to rotate. The first cable cover portion 57c, which is formed in a substantially U-shaped groove, accommodates the first cable 61 between the drum 23 and the first pulley 53. The second cable cover portion 57d, which is formed in a substantially U-shaped groove, accommodates the second cable 62 between the drum 23 and the second pulley 54. The drum cover portion 57a, the pulley cover portion 57b, the first cable cover portion 57c and the second cable cover portion 57d are in communication with each other while avoiding interference with the first and second cables 61 and 62. Furthermore, the cover member 57 includes attachment pieces 57e, 57f and 57g. The attachment piece 57e is provided at the drum cover portion 57a so as to extend away from the pulley cover portion 57b in a radial direction of the drum cover portion 57a. The attachment pieces 57f and 57g are provided at the respective first and second cable cover portions 57c and 57d in the vicinity of the drum cover portion 57a so as to extend away from each other.

The cover member 57, which is placed on the bracket 41 and the like in the axial direction of the rotating shaft 52 (i.e. in the vehicle width direction), is fixed on the bracket 41 in a manner where the attachment piece 57e is connected to the driving member 21 by means of, for example, a screw, the attachment pieces 57f and 57g are connected to the bracket 41, and the pulley cover portion 57b is connected to the rotating shaft 52 at a center portion thereof. The drum 23, the pulley 53, the second pulley 54, and the first and second cables 61 and 62, which extend between the drum 23 and the respective first and the second pulleys 53 and 54, are covered by the cover member 57, which is attached to the bracket 41. Accordingly, the bracket 41, on which the drum 23, the first and second pulleys 53 and 54, the first and second cables 61 and 62 and the like are assembled, and the cover member 57 are formed as a unit. Furthermore, because the cover member 57 covers (surrounds) outer circumferential portions of the respective first and second pulleys 53 and 54, the first and second cables 61 and 62 are avoided from being disengaged from the respective first and second pulleys 53 and 54. Additionally, according to the above-described configuration, because the first and second cables 61 and 62 are arranged within the respective first and second cable cover portions 57c and 57d, displacement of each component used for the door-side unit 40 may be avoided.

An inspection port 58, which is formed in an inverted V-shape and which opens to the outside of the door-side-unit 40, is formed at a cover wall of the pulley cover portion 57b in the vicinity where the first cable 61 and the second cable 62 cross and where the first cable cover portion 57c and the second cable cover portion 57d cross (are integrated) in order to visually inspect whether or not the first and the second cables 61 and 62 are crossed normally (e.g. in order to visually inspect a snaggle of the first and second cables 61 and 62 and the like).

Figure 8A:
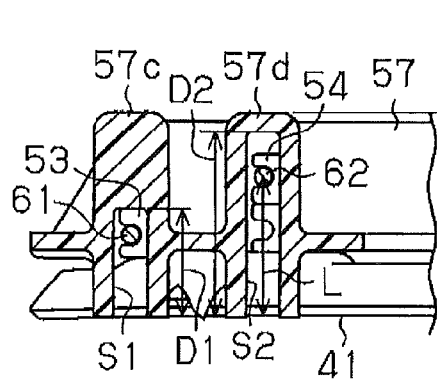
FIG. 8 is a cross-sectional diagram taken along line VIII-VIII in FIG. 7.
Figure 8B:
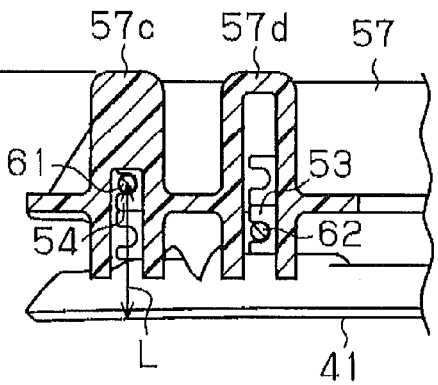

As illustrated in FIG. 8 of a cross-sectional diagram taken along line VIII-VIII in FIG. 7, the first and second cable cover portions 57c and 57d include groove portions S1 and S2, respectively. More specifically, a depth D1 (a distance between an opening portion and a base portion) of the groove portion S1 formed at the first cable cover portion 57c is formed to differ from a depth D2 (a distance between an opening portion and a base portion) of the groove portion S2 formed at the second cable cover portion 57d, specifically in the vicinity of the pulley cover portion 57b in view of the first and second cables 61 and 62, which are arranged so as to have a difference in height in the axial direction of the rotating shaft 52. More specifically, the depth D1 of the groove portion S1 for accommodating the first cable 61, which is guided to and engaged with the first pulley 53 arranged closer to the bracket 41, is set to be shallower than the depth D2 of the groove portion S2 for accommodating the second cable 62, which is guided to and engaged with the second pulley 54 arranged away from the bracket 41 relative to the first pulley 53. Additionally, the depth D1 of the groove portion S1 is set to be smaller than a distance L between the bracket 41 and the second cable 62, which is engaged with the second pulley 54. Therefore, even if the first and second cables 61 and 62 are guided in a wrong manner, more specifically, even if the first cable 61 is engaged with the second pulley 54 and the second cable 62 is engaged with the first pulley 53 (see FIG. 8), a base surface of the groove portion S1 interferes with the first cable 61, which is arranged so as to keep the distance L from the base plate 51. Accordingly, the cover member 57 is improperly attached to the bracket 41 by a distance Δ. Therefore, an improper arrangement of the first and the second cables 61 and 62 relative to the relay pulley 50 (i.e. the first and second pulleys 53 and 54) is recognizable.

According to the second embodiment, the following advantages and merits are achievable in addition to advantages and merits similar to the first embodiment. According to the second embodiment, because the drum 23, the first pulley 53 and the second pulley 54 are integrally accommodated within the single cover member 57, the bracket 41, on which the drum, the first and second pulleys 53 and 54 and the like are assembled, and the cover member 57 are connected to each other as a unit. Accordingly, the drum 23, the first pulley 53 and the second pulley 54 are compactly arranged. As a result, a space for assembling the entire door opening-and-closing apparatus within the slide door 20 is reduced, which may further result in enhancing freedom for placement of the door opening-and-closing apparatus within the slide door 20. Furthermore, because the first and second cables 61 and 62 are linearly guided to the first and second pulleys 53 and 54, respectively, between the drum 23 and the first and second pulleys 53 and 54, which are integrally accommodated within the cover member 57, an additional casing for guiding the first and second cables 61 and 62 does not need to be prepared. Hence, a number of components used for the door opening-and-closing apparatus may be reduced, which may further result in reducing assembly man-hour. In other words, the door opening-and-closing apparatus according to the second embodiments has a simple configuration. As a result, manufacturing costs for the door opening-and-closing apparatus may be reduced.

According to the second embodiment, the first and second cable cover portions 57c and 57d (i.e. the groove portions S1 and 2S) are formed so as to have different depths D1 and D2 in order to correspond to positions of the first and second cables 61 and 62, which are engaged with the first and second pulleys 53 and 54, respectively, in the vehicle width direction. Therefore, in the case where the first and second cables 61 and 62 are improperly engaged with the first and second pulleys 53 and 54 in the vehicle width direction, more specifically, in the case where the first cable 61 is engaged with the second pulley 54 and the second cable 62 is engaged with the first pulley 53, the first cable cover portion 57c, whose depth D1 is set to differ from the depth D2 of the second cable cover portion 57d so as to correspond to the positions (i.e. heights) of the first and second cables 61 and 62 in the vehicle width direction in the case where the first and second cables 61 and 62 are correctly engaged with the respective first and second pulleys 53 and 54, interferes with the first cable 61. Accordingly, the first cable 61 is not accommodated within the first cable cover portion 57c. Therefore, the improper arrangement of the first and second cables 61 and 62 relative to the respective first and second pulleys 53 and 54 in the vehicle width direction is easily recognizable. As a result, the first and second cables 61 and 62 may be avoided from being incorrectly engaged with the respective first and second pulleys 53 and 54.

According to the second embodiment, the number of components used for the door opening-and-closing apparatus may be reduced when comparing to the first embodiment in which the drum 23, the first pulley 53, the second pulley 54 and the like are covered by separate cover portions. Furthermore, according to the second embodiment, the driving member 21 on the one hand and the first and second pulleys 53 and 54 on the other, which are arranged in an up-and-down direction (i.e. the vehicle height direction) (i.e. the driving member 21 is arranged below the first and second pulleys 53 and 54 in the vehicle height direction), are arranged on the single bracket 41 so as to be aggregated. As a result, the driving unit 21, the first pulley 53, the second pulley 54 and the like are arranged on the single bracket 41 as a unit.

According to the second embodiment, the drum 23, the first pulley 53, the second pulley 54, the first cable 61, which extends between the drum 23 and the first pulley 53, and the second cable 62, which extends between the drum 23 and the second pulley 54, are separately covered by the drum cover portion 57a, the pulley cover portion 57b, the first cable cover portion 57c and the second cable cover portion 57d, respectively. Accordingly, for example, the first and second cables 61 and 62 may be avoided from being entangled with each other.

Figure 9:
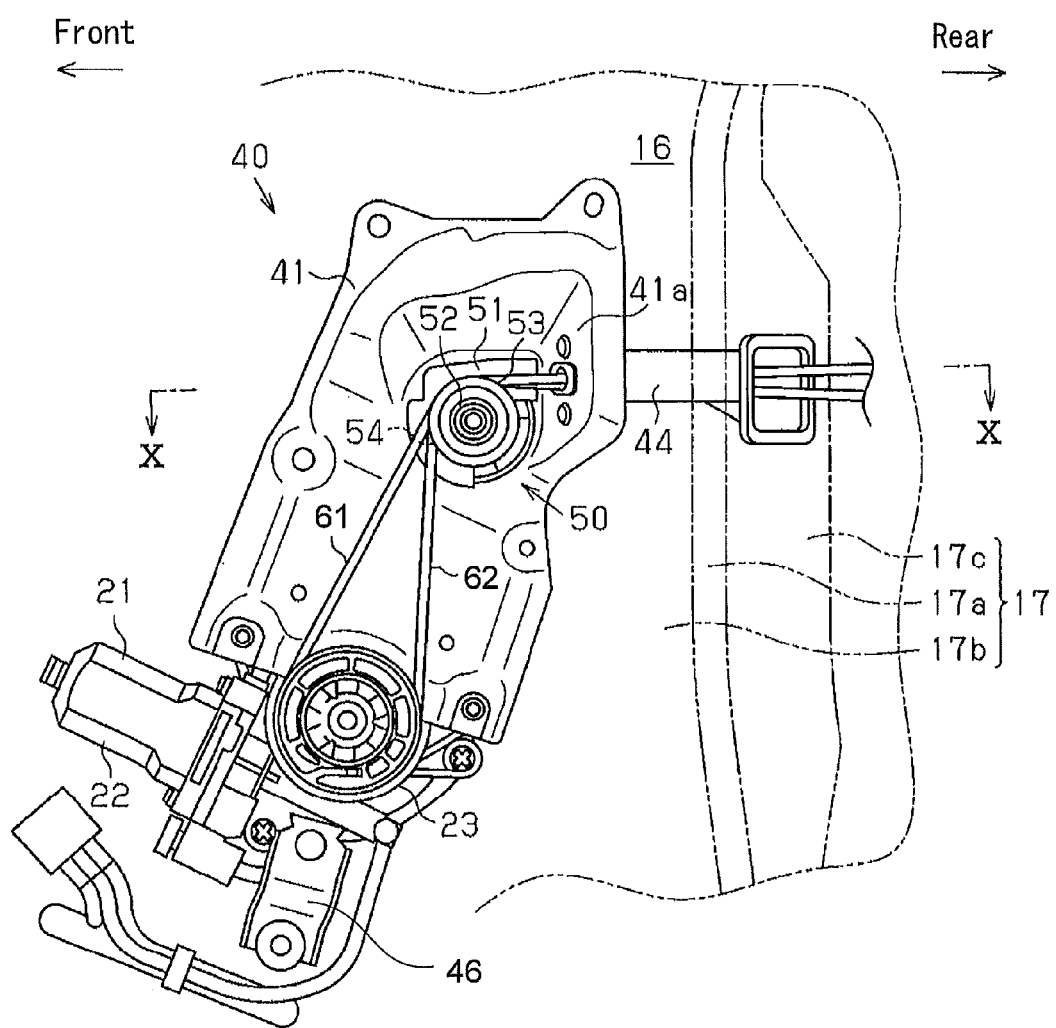
FIG. 9 is a front view of a modification example of the door opening-and-closing apparatus for the vehicle according to the second embodiment.

A modification example of the second embodiment will be described below. Additionally, only the difference between the second embodiment and the modification example will be described below. As illustrated in FIG. 9, a bump portion 17 is formed at a door inner panel 16, which serves as a door panel of the slide door 20, so as to protrude in a door thickness direction at an intermediate portion of a rear end portion of the door inner panel 16 in the vehicle height direction. The bump portion 17 includes a top portion 17a formed in a band shape and inclined portions 17b, which extend from respective end portions of the top portion 17a in the front-rear direction towards door inner panel 16 so as to form a substantially hill shape. The door-side unit 40 is attached on the door inner panel 16 so as to be positioned in front of the bump portion 17 in the front-rear direction. The door-side unit 40 is made of, for example, a metal plate. Furthermore, the door-side unit 40 includes the bracket 41, which extends in the substantially vehicle height direction. The bracket 41 is fixed on the door inner panel 16 by means of, for example, a bolt and a nut. Furthermore, the bracket 41 includes the inclined portion 41a, which is formed to curve along the bump portion (i.e. the inclined portion 17b), at the upper end portion of the bracket 41.

Additionally, a sub-bracket 46 may be fixed on the bracket 41 by means of, for example, a bolt and a nut, at a lower end portion of the driving member 21. Accordingly, the lower end portion of the driving member 21 is fixed on the door inner panel 16 via the sub-bracket 46. As a result, the driving member 21, which is relatively heavy, may be stably fixed on the door inner panel 16. Additionally, a thickness of the sub-bracket 46 may be set to be thicker than a thickness of the bracket 41.

Figure 10:
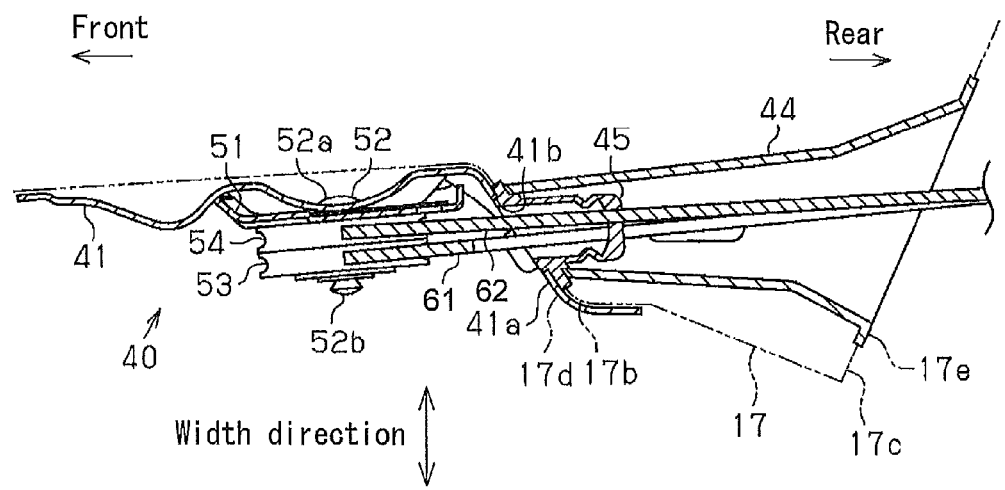
FIG. 10 is a cross-sectional diagram taken along line X-X in FIG. 9.

As illustrated in FIG. 10, the bump portion 17 includes insertion holes 17d and 17e at the respective inclined portions 17b and 17c so as to open to each other. The cable guiding member 44 is attached so as to penetrate the bump portion 17. More specifically, the cable guiding member 44 is provided within the bump portion 17 so a to connect (extend between) the insertion holes 17d and 17e in the front-rear direction. The hole 41b is formed on the inclined portion 41a of the bracket 41 so as to open to an opening portion of the insertion hole 17d in the front-rear direction. Then, the seal member 45, which is formed in the cylinder shape having the bottom cover and which is made of, for example, resin, is attached on the hole 41b so as to seal the opening portion thereof. The first and second cables 61 and 62 are fluid-tightly penetrated the seal member 45. Therefore, the water is prevented from entering the accommodation space for the first pulley 53, the second pulley 54 and the like (i.e. the bracket 41). More specifically, at least, the water is avoided from entering the accommodation space of the door-side unit 40 via the cable guiding member 44, which is provided within the bump portion 17 so as to connect the insertion holes 17d and 17e thereof.

Figure 11:
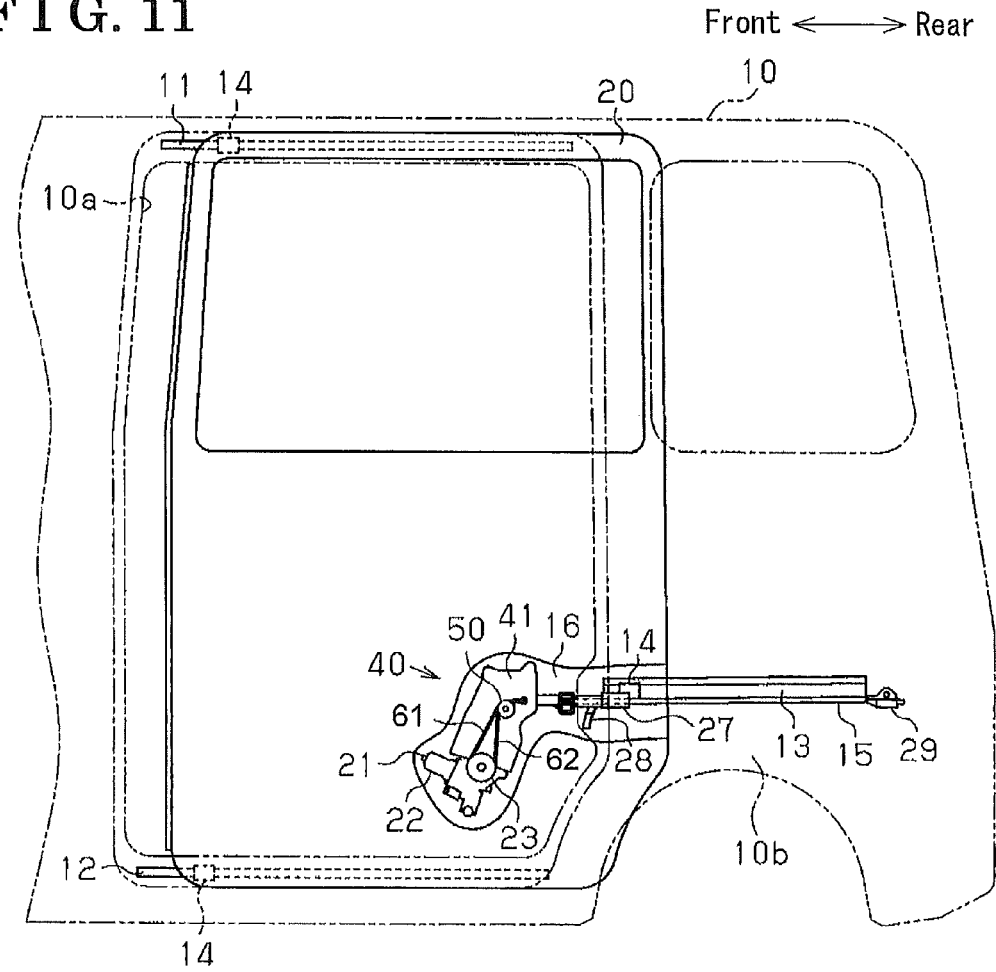
FIG. 11 is a diagram illustrating a state where the modification example of the door opening-and-closing apparatus for the vehicle according to the second embodiment is assembled to the vehicle.

As illustrated in FIG. 11, the first and second cables 61 and 62, which are guided to the outside of the slide door 20, is further guided to the vehicle body 10 from the slide door 20 via the guide pulley 27, which is connected to the guide roller unit 14 provided so as to move along the center rail 13 at a rear portion relative to the bump portion 17, so that the first and second cables 61 and 62 are arranged along the cable guide 15 in the front-rear direction. More specifically, the first cable 61 is guided to the cable guide 15 and is arranged at the front portion thereof, so that the other end portion of the first cable 61 is connected to the vehicle body 10 at the front end portion of the cable guide 15 via the tensioner 28, which is connected to the other end portion of the first cable 61, by means of, for example, the bolt and the nut. On the other hand, the second cable 62 is guided to the cable guide 15 and is arranged at the rear portion thereof, so that the other end portion of the second cable 62 is connected to the vehicle body 10 at the rear end portion of the cable guide 15 via the tensioner 29, which is connected to the other end portion of the second cable 62, by means of, for example, the bolt and the nut. Accordingly, the door-side unit 40 (the first pulley 53, the second pulley 54 and the like) may be arranged on the door inner panel 15 on the basis of the position of the center rail 13 in the vehicle height direction. In other words, because the space for arranging the door opening-and-closing apparatus within the slide door 20 is reduced, the door-side unit 40 may be arranged at any desired position on the basis of the position of the center rail 13 in the vehicle height direction.

The door opening-and-closing apparatus of the above-described embodiments may be modified as follows. The door opening-and-closing apparatus of the first embodiment may be modified so that the first pulley 33 includes one or more of the protruding portion 33c at a predetermined angular position(s). More specifically, in the case where plural protruding portions 33c are formed at the first pulley 33, the protruding portions 33c may be arranged at regular angular intervals in a circumferential direction of the first pulley 33.

The door opening-and-closing apparatus of the first embodiment may be modified so that the annular recessed portion is formed at the first pulley 33 and the protruding portion is formed at the second pulley 34. Furthermore, the door opening-and-closing apparatus of the second embodiment (including the modification example) may be modified so that the drum 23, the first pulley 53, the second pulley 54, the first cable 61, which is arranged so as to extend between the drum 23 and the first pulley 53, and the second cable 62, which is arranged so as to extend between the drum 23 and the second pulley 54, may be coved by a single cover portion as a whole.

According to the above-described embodiments, two cables (the first cable 24 (61) and the second cable 25 (62)) are used for the door opening-and-closing apparatus. However, one cable, which is hanged on the drum 23, may be used for the door opening-and-closing apparatus of the first and second embodiments.

Accordingly, the first and second pulleys (33, 34/53, 54), which guide the end portions of the first and second cables (24, 25/61, 62), are arranged in parallel with each other in the vehicle width direction so as to be rotatable about the single rotating shaft (32/52), which extends in the vehicle width direction. Accordingly, for example, the projected area of the entire first and second pulleys (33, 34/53, 54) in the front-rear direction of the vehicle, i.e. the arrangement space for the first and second pulleys (33, 34/53, 54) may be reduced. Furthermore, the first and second pulleys (33, 34/53, 54) are connectable to the slide door (20) while allowing the first and second pulleys (33, 34/53, 54) to rotate about the single rotating shaft (32/52). Accordingly, the number of components used for the door opening-and-closing apparatus may be reduced.

According to the above-described embodiments, the door opening-and-closing apparatus further includes the attachment member (31/41), which is fixed on the slide door (20) and which supports the rotating shaft (32/52). The first and second pulleys (33, 34/53, 54) are rotatably provided on the attachment member (31/41) in a state where the first and second pulleys (33, 34/53, 54) are placed on one another in an axial direction of the rotating shaft (32/52) while a predetermined surface (33e) of the first pulley (33/53) faces the predetermined surface (34e) of the second pulley (34/54). The protruding portion (33c) is provided at one of the first and second pulleys (33, 34/53, 54) so as to extend over the contact surface extended line (X) towards the other one of the first and second pulleys (33, 34/53, 54) in the axial direction. The annular recessed portion (34b) is formed at the other one of the first and second pulleys (33, 34/53, 54) so that the protruding portion (33c) is inserted to the annular recessed portion (34b) while forming a clearance therebetween and so that a relative rotation between the first and second pulleys (33, 34/53, 54) is allowed.

Accordingly, the first and second pulleys (33/53) are provided on the attachment member (31/41) in the state where the second pulley (34/54) is placed on the first pulley (33/53) in the axial direction of the rotating shaft (32/52) so that the predetermined surface (33e) of the first pulley (33) faces the predetermined surface (34e) of the second pulley (34) while allowing the first and second pulleys (34) to be rotatable about the rotating shaft (32). Furthermore, the protruding portion (33c) is provided at one of the first and second pulleys (33, 34) and the annular recessed portion (34b) is formed at the other one of the first and second pulleys (33, 34) so as not to hinder the relative rotation of the first and second pulleys (33, 34). In this case, if the first pulley (33) or the second pulley (34) having the protruding portion (33c) is arranged upside down, so that the first pulley (33) or the second pulley (34) is provided on the attachment member (31/41) in the state where the protruding portion (33c) extends towards the attachment member (31/41), the length of the first and second pulleys (33, 34) in the axial direction with reference to the attachment member (31/41) is increased by the protruding amount of the protruding portion (33c). Accordingly, the rotating shaft (32) may not properly support the first and second pulleys (33, 34) because the length of the rotating shaft (32) becomes insufficient in the case where the first pulley (33) is improperly arranged as above. Therefore, if the first pulley (33) or the second pulley (34) having the protruding portion (33c) is improperly arranged, i.e. in the case where first pulley (33) or the second pulley (34) having the protruding portion (33c) is arranged upside down, the improper arrangement may be recognizable because of insufficient length of the rotating shaft (32). Accordingly, the reliability on the assembly of the door opening-and-closing apparatus of the embodiments may be enhanced.

According to the first embodiment, the base plate (31) includes the flange (31c) arranged along the outer circumferential portion of at least the first pulley (33) positioned closer to the base plate (31). The first pulley (33) arranged closer to the base plate (31) includes the enlarged diameter portion (33b) positioned closer to the base plate (31) relative to the first guide groove (33a), which is formed at the intermediate outer circumferential portion of the first pulley (33) in the axial direction, so that the diameter of the enlarged diameter portion (33b) is set to be greater than the diameter of the first pulley (33) positioned away from the base plate (31) relative to the first guide groove (33a) and the diameter of the second pulley (34) arranged away from the base plate (31) relative to the first pulley (33).

Accordingly, in the case where the first pulley (33) or the second pulley (34) arranged closer to the base plate (31) is arranged upside down, so that the enlarged diameter portion 33b is positioned away from the base plate 31, the first cable (24) or the second cable (25) may not be inserted into the opening formed between the flange (31c) and the first pulley (33) or the second pulley (34) and the first cable (24) or the second cable (25) may not be engaged with the first pulley (33) or the second pulley (34) because the flange (31c) is arranged along the outer circumferential portion of the first pulley (33) or the second pulley (34) while forming the clearance (i.e. the opening) therebetween. Therefore, in the case where the first pulley (33) or the second pulley (34) arranged closer to the base plate (31) is arranged upside down, the improper arrangement of the first pulley (33) or the second pulley (34) is recognizable because the first cable (24) or the second cable (25) interferes with the enlarged diameter portion (33b) when being engaged with the first pulley (33) or the second pulley (34). As a result, the reliability of the door opening-and-closing apparatus may be further enhanced.

According to the above-described embodiments, the door opening-and-closing apparatus further includes the cover member (37) attached on the base plate (31) and covering the outer circumferential surfaces of the respective first and second pulleys (33, 34) except for the enlarged diameter portion (33b).

Accordingly, in the case where the first pulley (33) or the second pulley (34) having the enlarged diameter portion (33b) is arranged away from the base plate (31) relative to the other one of the first pulley (33) and the second pulley (34), the cover member (37) interferes with the enlarged diameter portion (33b) of the first pulley (33) or the second pulley (34), so that the cover member (37) may not be attached to the base plate (31). Therefore, in the case where the first pulley (33) or the second pulley (34) having the enlarged diameter portion (33b) is arranged away from the base plate (31), the improper arrangement of the first pulley (33) and the second pulley (34) is recognizable because the cover member (37) interferes with the enlarged diameter portion (33b) of the first pulley (33) or the second pulley (34) when the cover member (37) is attached to the base plate (31). Accordingly, the reliability of the door opening-and-closing apparatus may be further enhanced.

According to the above-described embodiments, the door opening-and-closing apparatus further includes the cover member (37/57) integrally covering the drum (23), the first pulley (33/53) and the second pulley (34/54).

According to the above-described embodiments, the cover member (37/57) integrally accommodates the drum (23), the first pulley (33/53) and the second pulley (34/54).

Accordingly, the drum (23), the first pulley (33/53) and the second pulley (34/54) are integrally covered by (accommodated within) the single cover member (37/57), so that a unity of the drum (23), the first pulley (33/53) and the second pulley (34/54) may be increased, and furthermore, the drum (23), the first pulley (33/53) and the second pulley (34/54) may be compactly arranged. As a result, the size of the entire door opening-and-closing apparatus according to the embodiments may be reduced. In other words, the space that the door opening-and-closing apparatus occupies within the slide door (20) may be reduced. Accordingly, the freedom for arranging (placing) the door opening-and-closing apparatus within the slide door (20) may be increased. Furthermore, because the first cable (24/61) is arranged so as to linearly extend between the drum (23) and the first pulley (33/53), which are integrally accommodated within the cover member (37/57), and the second cable (25/62) is arranged so as to linearly extend between the drum (23) and the second pulley (34/54), which are integrally accommodated within the cover member (37/57), an additional casing for guiding the first and second cables (33, 34/61, 62) does not need to be provided at the door opening-and-closing apparatus. Accordingly, the number of components used for the door opening-and-closing apparatus may be reduced and therefore, the man-hours needed for assembly may be reduced.

According to the second embodiment, the cover member (57) includes the first cable cover portion (57c), which has the opening portion opening in the vehicle width direction and which accommodates the first cable (61) arranged so as to extend between the drum (23) and the first pulley (53), and the second cable cover portion (57d), which has the opening portion opening in the vehicle width direction and which accommodates the second cable (62) arranged so as to extend between the drum (23) and the second pulley (54). The depth (D1) of the first pulley cover portion (57c) is set to differ from the depth (D2) of the second pulley cover portion (57d) so as to correspond to positions of the first and second cables (61, 62) engaged with the respective first and second pulleys (53, 54) in the vehicle width direction.

Accordingly, in the case where the first and second cables (61, 62) are improperly engaged with the first and second pulleys (53, 54), respectively, i.e. in the case where the first cable (61) is engaged with the second pulley (54) and the second cable (62) is engaged with the first pulley (53), the first cable cover portion (57c) or the second cable cover portion (57d), whose depths (D1, D2) are set to differ from each other so as to correspond to the positions of the first and second cables (61, 62) in the vehicle width direction, interferes with the first cable (61) or the second cable (62), so that the first cable (61) or the second cable (62) is not accommodated within the first cable cover portion (57c) or the second cable cover portion (57d). Accordingly, the improper arrangement of the first and second cables (61, 62) is easily recognizable, therefore avoiding the improper arrangement of the first and second cables (61, 62).

According to the embodiments, the door opening-and-closing apparatus further includes the bracket (41) fixed on the side door (20) and supporting the driving member (21) and the rotating shaft (52) so as to be positioned above the driving member (21) in a vehicle height direction.

According to the second embodiment and the modification example, the brackets (41) includes the inclined portion (41a) having the hole (41b) opening to the cable guiding member (44) for guiding the first and second cables (61, 62), which are engaged with the respective first and second pulleys (53, 54), to the vehicle body (10) and the seal member (45), which is attached on the hole (41b) and through which the first and second cables (61, 62) is fluid-tightly penetrates so as to be guided to the cable guiding member (44).

According to the second embodiment and the modification example, the door opening-and-closing apparatus further includes the cover member (57) attached on the bracket (41) and covering the drum (23), the first pulley (53), the second pulley (54) and the first and second cables (61, 62), which are arranged so as to extend between the drum (23) on the one hand and the first and second pulleys (53, 54) on the other.

Accordingly, the arrangement space for the first and second pulleys (33, 34/53, 54), which guide the respective first and second cables (24, 25/61, 62) from the slide door (20) to the vehicle body (10), may be reduced in the front-rear direction of the vehicle. Furthermore, the number of the components used for the door opening-and-closing apparatus may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the disclosure. Accordingly, it is expressly intended that all such variations, changes and equivalents which fall within the spirit and scope of the present invention as defined in the claims, be embraced thereby.

The invention claimed is:

1. A door opening-and-closing apparatus for a vehicle, comprising:
    a driving unit adapted to be disposed on a door of the vehicle for opening and closing a door opening formed in a body of the vehicle and having a driving source, a drum, which is rotatably driven by the driving source, and a first cable and a second cable, said cables are wound around the drum, have first and second end portions, respectively, and are configured to be connected to the vehicle body;
    a rotating shaft having a predetermined length and adapted to be fixed to the vehicle door and extend in a vehicle width direction;
    a first pulley supported by the rotating shaft so as to be rotatable thereabout and having a first guide groove, within which one of the first and second cables, which is reeled in and reeled out from the drum, is engaged when said one cable is connected to the vehicle body;
    a second pulley supported by the rotating shaft so as to be rotatable thereabout and arranged in parallel with the first pulley, said second pulley having a second guide groove, within which the other one of the first and second cables, which is reeled in and reeled out from the drum, is engaged when the other cable is connected to the vehicle body; and an attachment member adapted to be fixed to the vehicle door and supporting the rotating shaft, wherein the first and second pulleys are rotatably disposed on the rotating shaft in a state where the first and second pulleys are placed on one another in an axial direction of the rotating shaft with a predetermined surface of the first pulley facing a predetermined surface of the second pulley; and a rigid protruding portion being an integral one piece element with one of the first and second pulleys and extending over a contact surface extended line towards the other one of the first and second pulleys in the axial direction, and an annular recessed portion is integrally formed in the other one of the first and second pulleys;

wherein, when the first and second pulleys are correctly assembled on the rotating shaft, the protruding portion is inserted into the annular recessed portion with a clearance therebetween so that relative rotation between the first and second pulleys is allowed; and wherein, when the first and second pulleys are not correctly assembly on the rotating shaft, the protruding portion is not inserted into the annular recessed portion and the predetermined length of the rotating shaft is not sufficient to support both the first and second pulleys.

2. The door opening-and-closing apparatus for the vehicle according to claim 1, wherein the attachment member includes a flange arranged along an outer circumferential portion of at least the first pulley, and the first pulley includes an enlarged diameter portion positioned on one side of said first guide groove in the axial direction and a second diameter portion positioned on the other side of said first guide groove in the axial direction, said enlarged diameter portion positioned closer to the attachment member than the first guide groove, wherein a diameter of the enlarged diameter portion is greater than a diameter of the second diameter portion and the diameter of the enlarged diameter portion is greater than a diameter of the second pulley.

3. The door opening-and-closing apparatus for the vehicle according to claim 2 further comprising a cover member attached to the attachment member and covering the first and second pulleys except for the enlarged diameter portion.

* * * * *